United States Patent [19]

Burns et al.

[11] Patent Number: 5,545,687
[45] Date of Patent: Aug. 13, 1996

[54] PREPARATION OF HIGH DENSITY BORON CARBIDE CERAMICS WITH PRECERAMIC POLYMER BINDERS

[75] Inventors: Gary T. Burns; Gregg A. Zank, both of Midland; Jeffrey A. Ewald, Bay City, all of Mich.

[73] Assignee: Dow Corning Corporation, Midland, Mich.

[21] Appl. No.: 482,601

[22] Filed: Feb. 21, 1990

[51] Int. Cl.[6] .................................................. C08K 3/02
[52] U.S. Cl. .......................... 524/701; 264/63; 264/65; 264/29.7; 264/86; 264/176.1; 264/319; 501/87
[58] Field of Search .................... 501/87, 95, 96; 264/63, 29.7, 86, 176.1, 319, 65; 524/701; 106/278.1, 278.11, 257.13

[56] References Cited

U.S. PATENT DOCUMENTS

| | | | |
|---|---|---|---|
| 4,081,284 | 3/1978 | Prochazka et al. | 106/44 |
| 4,195,066 | 3/1980 | Schwetz et al. | 423/291 |
| 4,260,780 | 4/1981 | West | 556/430 |
| 4,298,559 | 11/1981 | Baney et al. | 264/65 |
| 4,312,970 | 1/1982 | Gaul, Jr. | 526/279 |
| 4,320,204 | 3/1982 | Weaver | 501/91 |
| 4,340,619 | 7/1982 | Gaul, Jr. | 427/228 |
| 4,395,460 | 7/1983 | Gaul | 428/408 |
| 4,397,828 | 8/1983 | Seyferth et al. | 423/344 |
| 4,404,153 | 9/1983 | Gaul, Jr. | 264/292 |
| 4,455,414 | 6/1984 | Yajima et al. | 528/30 |
| 4,482,689 | 11/1984 | Haluska | 528/25 |
| 4,524,138 | 6/1985 | Schwetz et al. | 501/90 |
| 4,540,803 | 9/1985 | Cannady | 556/412 |
| 4,543,344 | 9/1985 | Cannady | 501/92 |
| 4,762,895 | 8/1988 | Chandra et al. | 525/474 |
| 4,774,312 | 9/1988 | Burns | 528/33 |
| 4,810,436 | 3/1989 | Johnson | 501/95 |
| 4,832,895 | 5/1989 | Johnson | 501/95 |
| 4,835,238 | 5/1989 | Burns | 528/28 |
| 4,857,490 | 8/1989 | Johnson | 501/96 |
| 4,931,100 | 6/1990 | Johnson | 106/209 |
| 4,946,919 | 8/1990 | Johnson | 526/285 |

FOREIGN PATENT DOCUMENTS

| | | |
|---|---|---|
| 53-073000 | 6/1978 | Japan. |
| 54-134744 | 10/1979 | Japan. |
| 2014193 | 1/1979 | United Kingdom. |

OTHER PUBLICATIONS

Dole et al, Ceram. Eng. Sci. Proc., pp. 1151–1160 (1985).
Schwetz et al, J. Less Common Metals, 82, 37–47 (1981).
Bougoin et al, J. Mat. Sci., 22, 109–114 (1987).
Noll, Chem. and Technology of Silicones, Chpt. 5, 347–349, 7.
Burns et al, J. Mat. Sci., 22 (1987), 2609–2614.
West, 25 Polymer Preprints, 4 (1984).

*Primary Examiner*—Charles T. Jordan
*Assistant Examiner*—A. Chi
*Attorney, Agent, or Firm*—Roger E. Gobrogge

[57] ABSTRACT

This invention relates to the preparation of a highly densified boron carbide ceramic body by the pyrolysis of a mixture comprising boron carbide powder and a preceramic organosilicon polymer selected from the group consisting of polysiloxanes, polysilazanes, polysilanes, metallopolysiloxanes and metallopolysilanes. Such highly densified ceramic bodies can be prepared by sintering under pressure or by utilizing a pressureless process.

29 Claims, No Drawings

PREPARATION OF HIGH DENSITY BORON CARBIDE CERAMICS WITH PRECERAMIC POLYMER BINDERS

BACKGROUND OF THE INVENTION

This invention relates to the preparation of a highly densified boron carbide ceramic body by the pyrolysis of a mixture comprising boron carbide powder and a preceramic organosilicon polymer selected from the group consisting of polysiloxanes, polysilazanes, polysilanes, metallopolysiloxanes and metallopolysilanes. Such highly densified ceramic bodies can be prepared by sintering under pressure or by utilizing a pressureless process.

The products and processes of the present invention have several distinct advantages over prior art methods. (1) The green bodies have high strengths, thus, facilitating handling and machining before sintering. (2) The composition of the preceramic mixture can be varied to accommodate various molding techniques such as press and sinter or transfer/ injection molding and sinter applications. (3) The green bodies of the invention are more dense and, thus, yield ceramics which have less shrinkage and greater sintered tolerance control upon pyrolysis.

Boron carbide ceramic bodies are well known in the art. They have found particular utility in wear parts, armor and the nuclear industry because of their high modulus, high hardness, low density, resistance to wear and nuclear properties. Early methods for producing these bodies involved hot-pressing boron carbide powder at temperatures up to 2300° C. These methods, however, are relatively complex in that they require the use of high pressure during sintering and they often fail to produce bodies with high density. Additionally, these methods do not produce green bodies and are of limited utility in forming bodies of complex size and shape.

Numerous authors and inventors such as Dole et al. in "Densification and Microstructure Development in Boron Carbide", Ceram. Eng. Sci. Proc, pp 1151–1160 (1985), Schwetz et al. in U.S. Pat. No. 4,195,066, Henney et al. in UK Patent Application GB 2,014,193, and Schwetz et al. in J. Less Common Metals, 82, 37–47 (1981) describe achieving high density boron carbide ceramics by the pressureless sintering of a mixture comprising boron carbide powder and carbon. As disclosed therein, the authors/inventors mixed between 0.5 and 12% free carbon in the form of Novolac resin, phenolic resin, graphite, sugar, or polyvinyl alcohol with boron carbide powder and sintered to temperatures of 2100°–2300° C. to obtain ceramic bodies with densities ≧97%. These references, however, do not describe the inclusion of organosilicon polymers as the source of free carbon.

Weaver in U.S. Pat. No. 4,320,204 teaches the formation of high density (>94%), refractory ceramics by the pressureless pyrolysis of 60–98% boron carbide powder 2–40% silicon carbide powder and, optionally, up to 10% aluminum. This reference, however, does not teach the use of organosilicon polymers as the source of SiC.

Prochazka et al. in U.S. Pat. No. 4,081,284 and Schwetz et al. in U.S. Pat. No. 4,524,138 teach the formation of high density ceramics by pressureless sintering varying amounts of boron carbide powder, silicon carbide powder and free carbon. Neither reference, however, describes an organosilicon polymer as the source of SiC and/or free carbon.

Bougoin et al. in "Pressureless Sintering of Boron Carbide with the Addition of Polycarbosilane", J. Mat. Sci., 22, pp 109–114 (1987) describe mixing polycarbosilane, boron carbide powder and a source of free carbon to form a mixture, pressing the mixture to form a green body, and sintering at 2175° C. Sintered bodies with densities ≧92% were thereby obtained. This reference, however, does not describe the inclusion of organosilicon polymers other than the polycarbosilane. Moreover, the reference clearly states that the addition of an organic carbon source is necessary for ultimate densification.

Japanese Patent 53073000 describes a neutron absorption shield material consisting of a polyorganosiloxane, a crosslinking agent, a crosslinking catalyst and boron carbide powder. This reference, however, is not directed to the formation of high density ceramics. Thus, the reference doesn't describe sintering the above mixture to the elevated temperatures claimed herein.

The present application discloses for the first time that high density, high strength boron carbide ceramic products may unexpectedly be obtained by sintering a mixture comprising a preceramic organosilicon polymer and boron carbide powder.

SUMMARY OF THE INVENTION

The present invention relates to a method of preparing a handleable boron carbide green body. The method comprises blending boron carbide powder and a preceramic organosilicon polymer selected from the group consisting of polysiloxanes, polysilazanes, polysilanes, metallopolysiloxanes and metallopolysilanes to a uniform mixture. The preceramic organosilicon polymer is present in this mixture in an amount such that the free carbon value of the mixture is greater than 0.2 weight percent based on the total weight of the boron carbide powder and the char derived form the preceramic organosilicon polymer. The uniform mixture is then formed into the desired shape under pressure at a temperature less than about 500° C. to obtain the handleable green body.

The invention also relates to a method of preparing a sintered ceramic body comprising boron carbide. The method comprises sintering the handleable green body formed above in an inert atmosphere at a temperature greater than about 2200° C. The sintered bodies formed thereby have densities greater than about 2.0 g/cm$^3$.

DETAILED DESCRIPTION OF THE INVENTION

The present invention relates to the preparation of highly densified sintered bodies from preceramic organosilicon polymers and boron carbide powder. The sintered bodies produced from the practice of this invention have densities greater than about 2.0 g/cm$^3$ which corresponds to about 80% of the theoretical density of boron carbide. As used herein, the theoretical density of the body is assumed to be equal to that of boron carbide, 2.52 g/cm$^3$, even though some SiC is also generated from the preceramic polymer. Such highly densified bodies are useful in wear parts, armor and the nuclear industry.

The invention also relates to a method of preparing handleable green bodies. By "handleable green bodies" we mean green bodies which have sufficient green strength to be handled or machined to a desired shape prior to sintering. Generally, green strengths of 300 psi or more may be obtained in the practice of this invention. This green strength is achieved primarily because the preceramic mixture includes an organosilicon polymer which acts as a matrix for the boron carbide powder. The increased green strength obtained by the practice of this invention alleviates the problems associated with handling fragile objects and allows for the production of more complex shapes through machining, milling etc.

The green bodies may be formed by conventional techniques known in the art. Such methods include pressure molding, uniaxial pressing, isopressing, extrusion, transfer molding, injection molding, and the like. The present invention is particularly advantageous in this respect since the composition of the preceramic mixture ($B_4C$:polymer ratio) can easily be changed to accommodate the use of multiple molding techniques without affecting the quality of the sintered product.

The shaped green bodies are then fired to an elevated temperature under an inert atmosphere to convert them into ceramic articles having densities greater than about 80% of theoretical. It is preferred that the density of the ceramic article be greater than about 90% of theoretical (2.27 $g/cm^3$). It is most preferred that the density be greater than about 2.4 $g/cm^3$ (95% of theoretical).

Upon pyrolysis, the organosilicon polymers of this invention yield both SiC and free carbon. This factor tends to decrease the amount of shrinkage that occurs when the mixture is sintered since the SiC forms in the interstices between the boron carbide grains, thus limiting the shrinkage due to densification. Because less shrinkage occurs, sintered objects with increased tolerance control can be formed.

The resultant ceramic bodies formed from the above pyrolysis comprise a mixture of boron carbide and silicon carbide. Generally, the amount of SiC is less than about 10% of the total ceramic weight. The expression "boron carbide body" is used herein to describe these ceramic bodies.

The compositions of this invention may be sintered either under pressure or by using a pressureless process to produce a highly densified ceramic article. Since the sintering process employing pressure will generally produce ceramic articles with higher density, such a method would be preferred if maximum density were desired. Generally, however, the pressureless sintering process is preferred because of the simplified operations involved.

Inert atmospheres are used for sintering to prevent oxygen incorporation and silica formation. The sintering process as well as the density of the sintered product are thereby enhanced. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr, preferably 0.1–0.3 torr. Exemplary of a combined process might be firing the composition in argon up to 1200° C., firing from 1200° to 1500° C. in a vacuum and firing from 1500° to 2275° C. under argon.

Sintering may be performed in any conventional high temperature furnace equipped with a means to control the furnace atmosphere. Temperatures of about 2200° C. or higher are generally used with the preferred range being about 2250°–2300° C. The most preferred sintering temperature is about 2275° C. Though lower temperatures can be used, the ceramic product may not possess the desired density.

The temperature schedule for sintering depends on both the volume of parts to be fired and the composition of the mixture. For smaller objects the temperature may be elevated relatively rapidly. For larger objects or those with large concentrations of the organosilicon polymer, however, more extended programs are needed to create uniform ceramic bodies.

The organosilicon polymers useful in this invention are generally well known in the art. Organosilicon polymers with a significant ceramic char yield are preferred because the amount of binder shrinkage that occurs upon pyrolysis decreases as the char yield increases. Preferably, therefore, the ceramic char yield is greater than about 20 weight percent. Most preferably, organosilicon polymers with ceramic char yields greater than about 35 weight percent will be employed.

The organosilicon polymer must also yield a ceramic char containing free carbon. Using a rule of mixtures, the ceramic char must contain greater than about 30 weight percent total carbon in order for free carbon to be present. Organosilicon polymers with greater than 40 weight percent total carbon are preferred since they contain about 86 weight percent SiC and 14 weight percent free carbon. (i.e. for every 100 g of char, 60 g Si/28(mw for Si)= 2.14 mole Si present; 2.14 mole×12(mw for C) = 26 g C as SiC; and 40 g total C-26 g C as SiC= 14 g free carbon) Most preferred are organosilicon polymers which yield ceramic chars with greater than about 50 weight percent total carbon since such ceramic chars contain about 28 weight percent free carbon. It is generally preferred that the ceramic char contain at least 10 weight percent free carbon. It is more preferred that the ceramic char contain at least 25 weight percent free carbon.

Organosilicon polymers within the scope of this invention include polysiloxanes, polysilazanes, polysilanes, polymetallosiloxanes and polymetallosilanes. If the organosilicon polymer is an organopolysiloxane, it may contain units of general structure $[R_3SiO_{0.5}]$, $[R_2SiO]$, $[RSiO_{1.5}]$, and $[SiO_2]$ where each R is independently selected from the group consisting of hydrogen, alkyl radicals containing 1 to 20 carbon atoms such as methyl, ethyl, propyl etc., aryl radicals such as phenyl, and unsaturated alkyl radicals such as vinyl. Preferred organopolysiloxanes contain varying amounts of $[PhSiO_{1.5}]$, $[MeSiO_{1.5}]$, $[MePhSiO]$, $[Ph_2SiO]$ and $[PhViSiO]$ units. Especially preferred organopolysiloxanes are described by the unit formulas:

or

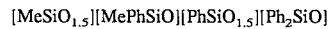

wherein varying mole fractions of each unit are present to provide resinous polymers with convenient molding characteristics. Organopolysiloxanes useful in this invention may contain other siloxane units in addition to, or in place of, the siloxane units just mentioned. Examples of such siloxane units include $[ViSiO_{1.5}]$, $[MeHSiO]$, $[MeViSiO]$, $[Me_2SiO]$, $[Me_3SiO_{0.5}]$, and the like. Mixtures of organopolysiloxanes may also be employed.

The organopolysiloxanes of this invention can be prepared by techniques well known in the art. The actual method used to prepare the organopolysiloxanes is not critical. Most commonly, the organopolysiloxanes are prepared by the hydrolysis of organochlorosilanes. Such methods, as well as others, are described in Noll, *Chemistry and Technology of Silicones,* chapter 5 (translated 2d Ger. Ed., Academic Press, 1968).

If the preceramic organosilicon polymer is a polysilazane, it may contain units of the type $[R_2SiNH]$, $[RSi(NH)_{1.5}]$, and/or

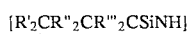

where each R is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl and each R', R", and R'" is independently selected from the group consisting of hydrogen, alkyl radicals having 1 to 4 carbon atoms, aryl radicals such as phenyl, and unsaturated hydrocarbon radicals such as vinyl. Generally, polysilazanes which contain [Ph$_2$SiNH],[PhSi(NH)$_{1.5}$], and/or

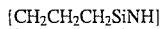

units are preferred. The polysilazanes useful in this invention may, however, contain other silazane units such as [MeSi(NH)$_{1.5}$], [Me$_2$SiNH], [ViSi(NH)$_{1.5}$], [Vi$_2$SiNH], [Ph-MeSiNH], [HSi(NH)$_{1.5}$], [PhViSiNH], [MeViSiNH], and the like.

The polysilazanes of this invention can be prepared by techniques well known in the art. The actual method used to prepare the polysilazane is not critical. Suitable preceramic silazane polymers or polysilazanes may be prepared by the methods of Gaul in U.S. Pat. Nos. 4,312,970 (issued Jan. 26, 1982), 4,340,619 (issued Jul. 20, 1982), 4,395,460 (issued Jul. 26, 1983), and 4,404,153 (issued Sep. 13, 1983), all of which are hereby incorporated by reference. Suitable polysilazanes also include those prepared by the methods of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other polysilazanes suitable for use in this invention can be prepared by the methods of Cannady in U.S. Pat. Nos. 4,540,803 (issued Sep. 10, 1985) and 4,543,344 (issued Sep. 24, 1985) and Burns et al. in J. Mater. Sci, 22 (1987), pp 2609–2614 which are hereby incorporated by reference. Especially preferred polysilazanes are the polysilacyclobutasilazanes, polydisilacyclobutasilazanes, and silane-modified polysilacyclobutasilazanes. For purposes of this specification, the term "silacyclobutasilazane polymer" is intended to include the polysilacyclobutasilazanes, polydisilacyclobutasilazanes, and silane-modified polysilacyclobutasilazanes. Silacyclobutasilazane polymers are thermally or catalytically crosslinkable. Therefore, green bodies prepared from these silacyclobutasilazane polymers may be cured prior to the sintering step. Such cured green bodies generally possess higher green strengths than similar uncured green bodies.

The polysilacyclobutasilazanes of this invention can be prepared, for example, by the method of Burns in U.S. Pat. No. 4,835,238 which is incorporated herein in its entirety; the polydisilacyclobutasilazanes can be prepared, for example, by the method of Burns in U.S. Pat. No. 4,774,312 which is incorporated herein in its entirety; and the preferred silane-modified polysilacyclobutasilazanes can be prepared, for example, by the method of Burns in U.S. patent application Ser. No. 07/277,080 or U.S. patent application Ser. No. 07/213,380, now allowed, which are incorporated herein in their entirety.

If the preceramic organosilicon polymer is a polysilane, it may contain units of general structure [R$_3$Si], [R$_2$Si], and [RSi] where each R is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl. Preferred polysilanes contain 5 to 25 mole percent [Me$_2$Si] units and 75 to 95 mole percent [PhMeSi] units. Polysilanes useful in this invention may contain other silane units in addition to, or in place of, the silane units just mentioned. Examples of such silane units include [MeSi], [PhSi], [ViSi], [PhMeSi], [MeHSi], [MeViSi], [Ph$_2$Si], [Me$_2$Si], [Me$_3$Si], and the like.

The polysilanes of this invention can be prepared by techniques well known in the art. The actual method used to prepare the polysilanes is not critical. Suitable polysilanes may be prepared by the reaction of organohalosilanes with alkali metals as described in Noll, *Chemistry and Technology of Silicones*, 347–49 (translated 2d Ger. Ed., Academic Press, 1968). More specifically, suitable polysilanes may be prepared by the sodium metal reduction of organo-substituted chlorosilanes as described by West in U.S. Pat. No. 4,260,780 and West et al. in 25 *Polym. Preprints* 4 (1984), both of which are incorporated by reference. Other suitable polysilanes can be prepared by the general procedures described in Baney, et al., U.S. patent application Ser. No. 4,298,559 which is incorporated by reference.

If the preceramic organosilicon polymer is a polymetallosiloxane, it may include any suitable polymer containing repeating metal-O-Si units. Examples of suitable compounds include borosiloxanes and alumosiloxanes which are both well known in the art. For instance, Noll, *Chemistry and Technology of Silicones*, chapter 7, (translated 2d Ger. Ed., Academic Press, 1968) describes numerous polymers of this type as well as their method of manufacture. Additionally, Japanese Kokai Patent No. Sho 54[1979]-134744 granted to Tamamizu et al. and U.S. Pat. No. 4,455,414 granted to Yajima et al. also describe the preparation and utility of various polymetallosiloxanes as binders for SiC powder. Both of these references are hereby incorporated by reference.

If the preceramic organosilicon polymer is a polymetallosilane, it may include any suitable polymer containing repeating metal-Si units. Examples of suitable metals to be included therein include boron, aluminum, chromium and titanium. The method used to prepare said polymetallosilanes is not critical. It may be, for example, the method of Chandra et al. in U.S. Pat. No. 4,762,895 or Burns et al. in U.S. patent application Ser. No. 07/264,561, both of which are incorporated by reference.

The above organosilicon polymers which contain vinyl groups may be preferred since vinyl groups attached to silicon provide a mechanism whereby the organosilicon polymer can be cured prior to sintering. Furthermore, silacyclobutyl-containing units may also be preferred since they allow for curing without the need for added catalysts. Finally, mixtures of any of the above organosilicon compounds are also contemplated by this invention.

Specific methods for preparation of suitable organosilicon polymers are illustrated in the examples included in the present specification.

The use of organosilicon polymers as binders for boron carbide powder is particularly advantageous over binders of the prior art since a polymer can be chosen which will provide the desired amount of free carbon in the char and a suitable char yield. In this manner, the polymer can be tailored to obtain a polymer/B$_4$C ratio in the preceramic mixture which is suitable for the molding application utilized and still have the appropriate free carbon in the char. If one were to use the polymeric carbon sources which result in a char consisting of 100% free carbon, for instance, increasing the polymer/B$_4$C ratio of the preceramic mixture for a given molding technique would result in large carbon excesses, thus impeding the ultimate densification of the ceramic body.

The preceramic organosilicon polymer is present in the compositions of the present invention at such a level that the free carbon value of the mixture is greater than 0.2 weight percent, based on the total weight of the boron carbide powder and the char derived from the preceramic organosilicon polymer.

What is meant by "free carbon value of the mixture" in this invention is the amount of free or excess carbon derived from the organosilicon polymer during pyrolysis expressed as a weight percentage based on the total weight of the boron carbide powder and the char derived from the organosilicon polymer. The total amount of carbon in the ceramic char equals the amount of free or excess carbon plus the amount of carbon in the form of silicon carbide or boron carbide.

The amount of free carbon derived from the organosilicon polymer is determined by pyrolysis of the polymer in the absence of any boron carbide powder, to an elevated temperature under an inert atmosphere until a stable ceramic char is obtained. For purposes of this invention, a "stable ceramic char" is defined as the ceramic char produced at an elevated temperature which will not significantly decrease in weight upon further exposure at the elevated temperature. Normally, a stable ceramic char is produced upon pyrolysis at 1800° C. for about 30 minutes under argon. Other elevated temperatures can be used to form the stable ceramic char but the length of exposure to the elevated temperature will need to be increased for temperatures less than 1800° C.

Both the ceramic yield and the silicon and carbon content of the stable ceramic char are then determined. Using a rule of mixtures, the amount of SiC and free carbon of the stable ceramic char can be calculated. The amount of free carbon thus calculated is normally expressed as the amount produced per gram of preceramic organosilicon polymer. Knowing the amount of free carbon produced by pyrolysis, one can determine how much polymer is required to obtain a polymer:boron carbide mixture with the desired free carbon value. Naturally, if one is using the same or very similar organosilicon polymer to prepare a sintered body, it is not required that the amount of free carbon be determined every time.

This procedure can perhaps be best illustrated by example. Assume an organosilicon polymer (100 g) which gives, upon pyrolysis to 1800° C., a char yield of 50 weight percent which contains 45 weight percent carbon and 55 weight percent silicon. Such a char contains 27.5 g (0.98 moles) silicon and 22.5 g carbon. Using a rule of mixtures, the char contains 0.98 moles (11.8 g) of carbon in the form of SiC. Since the char contains 22.5 g carbon, the amount of free carbon in the char is 10.7 g (22.5 g minus 11.8 g). Thus each gram of the preceramic organosilicon polymer yields 0.107 g free carbon.

If the preceramic mixture is to contain 100 g of boron carbide powder, the following equation is then used to calculate the amount of organosilicon polymer (x) to be added for a given free carbon value (FCV):

$$FCV = \frac{(0.107x)}{(100 + 0.5x)}$$

The numerator in the above equation represents the total amount of free carbon produced by x g of organosilicon polymer. The denominator in the above equations represents the amount of boron carbide (100 g) plus the char derived from x g of organosilicon polymer.

Using this procedure, the amount of organosilicon polymer required to prepare the compositions of this invention can be determined. This procedure avoids the costly and time consuming trial and error method which might otherwise be required.

This seemingly complex process can be summarized in the following steps:

1) A known weight of the organosilicon polymer is pyrolyzed to stable char;
2) the char is weighed and the result expressed as a weight percent of the starting compound, i.e. the "char yield" of the polymer;
3) The resultant char is analyzed for elemental content;
4) Using a rule of mixtures, the amount of "free carbon" in the char is calculated by subtracting the amount of carbon bound to silicon from the total carbon present. The resultant value is expressed as free carbon produced per gram of starting material; and
5) The amount of organosilicon polymer to be added for a given free carbon value is calculated using the following equation:

$$FCV = \frac{(FCP \times P)}{(B_4C) + (CYP \times P)}$$

Where FCP= grams of Free Carbon produced per gram of the Organosilicon Polymer; P= grams of Organosilicon Polymer; and CYP=Char Yield of the Organosilicon Polymer.

The free carbon value of the mixture must be greater than 0.2 weight percent based on the total weight of the boron carbide powder and the char derived from the organosilicon polymer. For free carbon values less than about 0.2 weight percent the density of the sintered body will generally fall below about 2.0 g/cm$^3$ (80% of theoretical). It is preferred that the free carbon value of the mixture be between 0.5 and 3.0 weight percent with a range of 1.0 to 2.0 weight percent being even more preferred. The optimum density is generally obtained when the free carbon value of the mixture is about 1.5 weight percent.

If the desired amount of free carbon can not be incorporated into the polymer, an additional source of carbon may be added. The procedure used for said incorporation is described and claimed in Co-Pending U.S. patent application Ser. No. 07/458,461, entitled "Multicomponent Binders for SiC Powders" by inventors Gary Thomas Burns, Ronald Keller, Willard Hauth and Chandan Kumar Saha which is incorporated herein by reference in its entirety.

The compositions of the invention also include boron carbide powders. Many of these materials are commercially available and well known in the art. For instance, Callery Chemical Co. produces a boron carbide powder with an average particle size of about 0.03 micron and Elektroschmeltzwerk, Kempten Gmblt (ESK) produces a boron carbide powder with an average particle size of about 2.25 micron. Generally, boron carbide powders with an average particle size of less than 5 microns are preferred; powders with an average particle size of less than 1.0 micron are more preferred; and those with an average particle size less than 0.1 micron are most preferred.

The compositions of this invention may also contain curing agents which are used to crosslink the organosilicon polymer prior to sintering. The green bodies produced thereby generally have higher strengths than the uncured articles and, thus, can better withstand any handling or machining processes prior to sintering. These curing agents are generally activated by heating the green body containing the curing agent to temperatures in the range of 50°–500° C.

Conventional curing agents which are useful in the present invention are well known in the art. Examples include organic peroxides such as dibenzoyl peroxide, bis-p-chlorobenzol peroxide, bis-2,4-dichlorobenzol peroxide, di-t-butyl peroxide, dicumyl peroxide, t-butylperbenzoate, 2,5-bis(t-butylperoxy)-2,3-dimethylhexane and t-butyl peracetate; and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the polymer. Therefore, the actual amount of the curing agent will depend on the activity of the actual agent used and the amount of polymer present. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

In addition to the above curing agent, a crosslinking agent may also be included in the mixture to modify the cure characteristics. These agents can include, for example, polyfunctional silanes or siloxanes. The preferred crosslinking agents are siloxanes with Si—H functional bonds such as $Ph_2Si(OSiMe_2H)_2$ or $PhSi(OSiMe_2H)_3$.

The addition of other processing aids such as lubricants, deflocculants and dispersants is also within the scope of this invention. Examples of such compounds include stearic acid, mineral oil, paraffin, calcium stearate, aluminum stearate, succinic acid, succinimide, succinic anhydride or various commercial products such as Oloa 1200™.

Once the amounts of the various components have been determined, they are combined in a manner that assures a uniform and intimate mixture so that areas of varying density throughout the sintered product are avoided. Uniform and intimate mixtures can be prepared by using conventional blending techniques such as grinding the various powders in either the dry or wet state or ultrasonic dispersion. Generally preferred is wet grinding where the various powders are mixed and ground with organic solvents and the solvent thereafter removed. Other mixing and grinding methods will be apparent to those skilled in the art.

The uniform and intimate mixture may then be formed into the desired shape. Preferably, the desired shape is formed under pressure using such methods as injection molding, uniaxial pressing, isopressing, extrusion, transfer molding, and the like.

The composition is preferably cured prior to its final shaping. Curing procedures are well known in the art. Generally, such curing can be carried out by heating the article to a temperature in the range of about 50° to 500° C., preferably in an inert atmosphere such as argon or nitrogen.

The green body obtained from the above process has sufficient green strength to allow for handling and/or alteration of the shape by processes such as machining, milling, etc. In this manner, products with precise shapes may be obtained.

Once the final shape has been obtained, the article is sintered in an inert atmosphere and/or under vacuum to a temperature of 2200° C. or more. The preferred sintering temperature is about 2250° C. to 2300° C. with about 2275° C. being most preferred.

Although not wishing to be limited by theory, it is thought that the free carbon derived from the organosilicon polymer plays three different roles in the formation of highly densified sintered bodies. First, it helps remove oxygen present in the boron carbide powder; secondly, it apparently acts to convert any low melting boron carbide phases ($B_xC$ x>4) to $B_4C$; and third, it inhibits the growth of large $B_4C$ grains and, thereby, enhances the sintered properties. Boron carbide powders often contain so called "free carbon." However, the "free carbon" present in the boron carbide powder does not appear to be as active or effective as free carbon generated in situ from the organosilicon polymer. It is not clear whether the free carbon produced in situ is more active chemically or whether it is simply more evenly dispersed. In any event, when the free carbon value of the mixture (as defined earlier) is about 1.5 weight percent, sintered bodies with maximum densities are obtained.

So that those skilled in the art can better appreciate and understand the invention, the following examples are given. Unless otherwise indicated, all percentages are by weight. Throughout this specification "Me" represents a methyl group, "Ph" represents phenyl group, "Bu" represents a butyl group, "Vi" represents a vinyl group, "IPA" represents isopropyl alcohol and "FCV" represents the free carbon value.

In the following examples, the analytical methods used were as follows:

Proton NMR spectra were recorded on either a Varian EM360 or EM390 spectrometer and the results presented herein in ppm; fourier transform IR spectra were recorded on a Nicolet 5 DX spectrometer. Gel permeation chromatography (GPC) data were obtained on a Waters GPC equipped with a model 600E systems controller, a model 490 UV and model 410 Differential Defractometer detectors; all values are relative to polystyrene. TGA and TMA data were recorded on a Du Pont 940 thermomechanical analyzer (TMA) and an Omnitherm thermal gravimetric analyzer (TGA) interfaced to an Omnitherm 2066 Computer.

Carbon, hydrogen and nitrogen analysis were done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the material to soluble forms of silicon and analyzing the solute for total silicon by atomic absorption spectrometry.

Melt compounding was done on a Brabender Plasticorder (Model PL-V151) equipped with roller blades. For larger scale mixing a one gallon Day mixer with sigma blade geometry was employed. This mixer was typically run at ⅔ capacity, employing 400 to 500 grams of binder and sufficient powder to reach the desired filler level. The high sheer roll milling was carried out on a Bolling 6 by 6 by 13 lab mill operated with one roller warm (70°–80° C.) and the other cooled with water. Test bars were formed on a Carver laboratory press (Fred S. Carver Inc., Summit, N.J.). Molding operation were performed on a 12.5 ton Hull console molding machine (model 359E) for transfer molding and an Arburg model 221E/221P for injection molding. Pyrolysis was carried out in an Astro graphite element tube furnace Model 1000-3060-FP12 equipped with an Eurotherm Controller/Programmer Model 822. The furnace was equipped with an Ircon Modeline Plus optical pyrometer to monitor the temperature above 900° C. Flex strengths (using the four-point bend technique) were determined on either a Model TTC or Model 8562 Instron instrument. Fired densities were measured by water immersion techniques according to ASTM C373-72. Machined test bars were prepared according to Mil. Std. 1942 (MR).

The boron carbide powder used was either from Callery Chemical Co. (Cal) or Elektroschmeltzwerk, Kempten Gmblt (ESK). The Phenolic resin was obtained from Union Carbide. A partially inhibited platinum catalyst ('Pt catalyst') was prepared by dissolving 1.0 g (1.49 mmole) of $(Bu_3P)_2PtCl_2$ and 0.182 g (2.98 mmole) of $HOCH_2CH_2NH_2$ in 100 g toluene.

Example I. Hot Press Sintering of Boron Carbide Powder Using Siloxane Binder

A. Polymer Synthesis

A mixture of 3960 g of $PhSi(OMe)_3$ and 620 g $(ViMe_2Si)_2O$ was added to a solution of 3 g of trifluoromethane sulfonic acid in 800 g of water. After approximately 20 minutes, the solution was refluxed for 5 hours. The solution was cooled and then neutralized with 2.73 g of potassium carbonate. The volatiles were removed by distillation until an internal temperature of 120° C. was reached. The reaction mixture was cooled and 1500 g of toluene and 125.7 g of a 3% solution of KOH in water were added The solution was refluxed and the water removed in a Dean-Stark trap. After all of the water was removed, the mixture was cooled and 20 mL of $Me_2ViSiCl$ added. After stirring at room temperature for 2 hours, the mixture was filtered through a 0.2 micron membrane filter and the filtrate concentrated by rotary evaporation. The residue was dried for about 1–2 hours at 100° C. and less than 1 torr. The yield was 3053.3 g.

B. Polymer pyrolysis and Char Composition Calculations

A blend of 14.85 g of the resin formed in part A, 5.16 g of $Ph_2Si(OSiMe_2H)_2$ and 0.01 g of Pt catalyst was prepared. An aliquot of the blend was crosslinked at 120° C. for one hour. An aliquot of the crosslinked polymer was weighed into a graphite crucible. The crucible was transferred into an Astro tube furnace. The furnace was evacuated to less than 20 torr and then backfilled with argon. This procedure was repeated twice. Under a purge of argon, the sample was heated to 1900° C. (room temperature to 1200° C. at 13° C./minute, 1200°–1900° C. at 5° C./minute) and held at temperature for 2 hours before cooling to room temperature. The sample had a mass retention of 44.9%. The elemental composition of the char was 53.4% carbon and 46.6% silicon (by difference). The following calculation was made: 100 g of cured polymer gives 44.9 g of a ceramic char consisting of 20.9 g silicon (0.75 mole) and 24.0 g carbon. The char consists of 29.9 g of SiC (66.6%) and 15.0 g C (33.4%). Therefore, every g of polymer gives 0.299 g of SiC and 0.15 g of excess C.

C. Mix Preparation and Hot pressing

A mix was prepared using the following procedure: 2.62 g of a mixture comprising the resin prepared in part A and $Ph_2Si(OSiMe_2H)_2$ in a 3:1 weight ratio was dissolved in 250 ml of hexane and 0.042 g of the Pt catalyst was mixed with 17.52 g of Callery boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. An aliquot of the above mixture was fired to 2275° C. in argon using the following program: room temperature to 2275° C. at 10° C./minute with a 1 hour hold at temperature. A pressure of 4 ksi was applied to the sample during the firing cycle. The density of the resultant piece was 2.44 g/cc. (97% of theoretical)

Example II. Hot Press Sintering of Boron Carbide Powder Using Siloxane Binder

A. Mix Preparation and Hot Pressing

A mix was prepared using the following procedure: 3.82 g of a mixture comprising the resin prepared in Example I, part A and $Ph_2Si(OSiMe_2H)_2$ in a 3:1 weight ratio 3:1 was dissolved in 250 ml of hexane and 0.074 g of the Pt catalyst was mixed with 26.11 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. An aliquot of the above mixture was fired to 2275° C. in argon using the following program: room temperature to 2275° C. at 10° C./minute with a 1 hour hold at temperature. A pressure of 4 ksi was applied to the sample during the firing cycle. The density of the resultant piece was 2.46 g/cc. (97.7% of theoretical)

Example III. Hot Press Sintering of Boron Carbide Powder Using Phenolic Resin (For Comparison)

A. Mix Preparation and Hot Pressing

A mix was prepared using the following procedure: 2.98 g of Phenolic Resin was dissolved in 250 ml of acetone and mixed with 25.61 g of Callery boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. An aliquot of the above mixture was fired to 2275° C. in argon using the following program: room temperature to 2275° C. at 10° C./minute with a 1 hour hold at temperature. A pressure of 4 ksi was applied to the sample during the firing cycle. The density of the resultant piece was 2.51 g/cc. (99.7% of theoretical)

Example IV. Hot Press Sintering of Boron Carbide Powder Using Phenolic Resin (For Comparison)

A. Mix Preparation and Hot Pressing

A mix was prepared using the following procedure: 0.88 g of Phenolic Resin was dissolved in 250 ml of acetone and mixed with 19.78 g of Callery boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. An aliquot of the above mixture was fired to 2275° C. in argon using the following program: room temperature to 2275° C. at 10° C./minute with a 1 hour hold at temperature. A pressure of 4 ksi was applied to the sample during the firing cycle. The density of the resultant piece was 2.51 g/cc. (99.7% of theoretical)

Example V. Hot Press Sintering of Boron Carbide Powder Using Phenolic Resin (For Comparison)

A. Mix Preparation and Hot Pressing

A mix was prepared using the following procedure: 1.59 g of Phenolic Resin was dissolved in 250 ml of acetone and mixed with 18.42 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. An aliquot of the above mixture was fired to 2275° C. in argon using the following program: room temperature to 2275° C. at 10° C./minute with a 1 hour hold at temperature. A pressure of 4 ksi was applied to the sample during the firing cycle. The density of the resultant piece was 2.50 g/cc. (99.2% of theoretical)

TABLE 1

Hot Press Results at 2275° C. and 4 ksi Pressure

| Ex No | B₄C Pwdr | Binder | % Binder | %C/% SiC | Fired Density | % Theo Density |
|---|---|---|---|---|---|---|
| 1 | Cal | Siloxane | 13.0 | 1.95/3.88 | 2.44 | 97.0 |
| 2 | ESK | Siloxane | 12.75 | 1.91/3.81 | 2.46 | 97.7 |
| 3 | Cal | Phenolic | 10.1 | 5.05/0.0 | 2.51 | 99.7 |
| 4 | Cal | Phenolic | 4.25 | 2.12/0.0 | 2.51 | 99.1 |
| 5 | ESK | Phenolic | 8.0 | 4.0/0.0 | 2.5 | 99.2 |

Cal = Callery Chemical Co.

Example VI. Pressureless Sintering of Boron Carbide Powder Using Siloxane Binder A. Mix Preparation and Firing A mix was prepared using the following procedure: 5.88 g of the resin prepared in Example I, part A and 0.1 g of the Pt catalyst was dissolved in 250 ml of hexane and mixed with 40.78 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars were heated to 250° C. for 24 hours to crosslink the polymer. The test bars had an average cured density of 1.48 g/cm³ and a strength of (4 pt bend) 1680 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.39 g/cm³. (94.8% of theoretical) The unmachined test bars had an average strength (4 pt bend) of 15.65 ksi and after machining the test specimens averaged 14.90 ksi.

Example VII Pressureless Sintering of Boron Carbide Powder Using Phenolic Resin (For Comparison)

A. Mix Preparation and Firing

A mix was prepared using the following procedure: 2.016 g of the Phenolic Resin was dissolved in 250 ml of acetone and mixed with 48.98 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars had an average cured density of 1.35 g/cm³ and a strength of (4 pt bend) 175 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.15 g/cm³. (85.4% of theoretical) The unmachined test bars had an average strength (4 pt bend) of 24.19 ksi and after machining the test specimens averaged 24.26 ksi.

Example VIII Pressureless Sintering of Boron Carbide Powder Using Phenolic Resin and Polycarbosilane (For Comparison)

A. Mix Preparation and Firing

A mix was prepared using the following procedure: 1.39 g of the Phenolic Resin and 3.79 g of polycarbosilane was dissolved in 250 ml of tetrahydrofuran and mixed with 45.11 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars had an average cured density of 1.45 g/cm³ and a strength of (4 pt bend) 210 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.41 g/cm³. (95.4% of theoretical) The unmachined test bars had an average strength (4 pt bend) of 14.4 ksi and after machining the test specimens averaged 15.55 ksi.

Example IX. Pressureless Sintering of Boron Carbide Powder Using Siloxane Binder A. Polymer Synthesis To a three-necked, 5 l flask with a drainage stopcock, thermometer, condenser and addition funnel was added 1790 g of water and 324 g of IPA. A mixture of 134.6 g (0.90 mole) of MeSiCl₃, 116.1 g (0.90 mole) of Me₂SiCl₂, 285.5 g (1.35 mole) of PhSiCl₃, 151.8 g (0.60 mole) of Ph₂SiCl₂, 176 g (1.25 mole) of MeViSiCl₂ dissolved in 792 g of toluene was added below the water surface over a six minute period. After stirring for 30 minutes, the water layer was drained. The resin layer was washed twice with warm tap water and transferred to a 3 L flask where it was azeotropically dried and bodied for 3 hours with 0.1% zinc octoate. The solvent was removed and the resin dried at 125° C. at 20 mm Hg.

B. Polymer pyrolysis and Char Composition Calculations

A sample of the resin formed in part A, mixed with 1% Lupersol™ (bis (t-butyl peroxy-2,5-dimethylhexane), was cured at 200° C. for 1 hour. An aliquot of the cross-linked polymer was weighed into a graphite crucible. The crucible was transferred into an Astro tube furnace. The furnace was evacuated to less than 20 torr and then backfilled with argon. This procedure was repeated twice. Under a purge of argon, the sample was heated to 1900° C. (room temperature to 1900° C. at 15° C./minute) and held at temperature for 2 hours before cooling to room temperature. The sample had a mass retention of 43.7%. The elemental composition of the char was 40.6% carbon and 59.4% silicon (by difference). The following calculation was made: 100 g of cured polymer gives 43.7 g of a ceramic char consisting of 26 g silicon (0.93 mole) and 17.7 g carbon. The char consists of 37.1 g of SiC (84.9%) and 6.6 g C (15.1%). Therefore, every g of polymer gives 0.371 g of SiC and 0.066 g of excess C.

C. Mix Preparation and Testing

A mix was prepared using the following procedure: 7.56 g of the resin prepared in part A and 0.10 g of Lupersol™ dissolved in 250 ml of hexane were mixed with 46.78 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars were heated to 250° C. for 24 hours to crosslink the polymer. The test bars had an average cured density of 1.51 g/cm$^3$ and a strength of (4 pt bend) 1595 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.39 g/cm$^3$. (94.8% of theoretical) The unmachined test bars had an average strength (4 pt bend) of 19.3 ksi and after machining the test specimens averaged 19.57 ksi.

Example X. Pressureless Sintering of Boron Carbide Powder Using Siloxane Binder

A. Polymer Synthesis

To a three-necked, 5 L flask with a drainage stopcock, thermometer, condenser and addition funnel was added 895 g of water and 162 g of IPA. A mixture of 67.2 g (0.45 mole) of MeSiCl$_3$, 9.55 g (0.05 mole) of PhMeSiCl$_2$, 84.5 g (0.40 mole) of PhSiCl$_3$ and 25.29 g (0.10 mole) of Ph$_2$SiCl$_2$ dissolved in 390 g of toluene was added below the water surface over a six minute period. After stirring for 30 minutes, the water layer was drained. The resin layer was washed twice with two 1 L portions of warm tap water. The resin layer was dried and concentrated in vacuo to give a brittle resin.

B. Polymer pyrolysis and Char Composition Calculations

An aliquot of the resin formed in part A was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. (room temperature to 1800° C. at 10° C./minute) and held at temperature for 2 hours before cooling to room temperature. The sample had a mass retention of 35.9%. The elemental composition of the char was 36.8% carbon and 63.2% silicon (by difference). The following calculation was made: 100 g of cured polymer gives 35.9 g of a ceramic char consisting of 22.7 g silicon (0.81 mole) and 13.2 g carbon. The char consists of 32.4 g of SiC (90.3%) SiC and 3.5 g C (9.7%). Therefore, every g of polymer gives 0.324 g of SiC and 0.035 g of excess C.

C. Mix Preparation and Testing

A mix was prepared using the following procedure: 5.01 g of the resin prepared in part A and 0.05 g of Lupersol™ dissolved in 250 ml of toluene were mixed with 48.20 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8× 2 mm in a WC lined die with a Carver laboratory press at 46 ksi. The test bars had an average cured density of 1.41 g/cm$^3$ and a strength of (4 pt bend) 306 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.34 g/cm$^3$. (92.9% of theoretical) The unmachined test bars had an average strength (4 pt bend) of 22.35 ksi and after machining the test specimens averaged 30.35 ksi.

Example XI. Pressureless Sintering of Treated Boron Carbide Powder Using Siloxane Binder A. Powder Treatment An aliquot of ESK boron carbide powder was agitated with 1M H$_2$SO$_4$ for 16 hours in an effort to remove any metallic impurities. The powder was filtered and dried.

B. Test Bar Fabrication and Testing

A mix was prepared using the following procedure: 5.89 g of the resin prepared in Example I, part A and 0.11 g of the Pt catalyst dissolved in 250 ml of hexane were mixed with 40.79 g of the treated ESK boron carbide powder of part A in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars were heated to 250° C. for 24 hours to crosslink the polymer. The test bars had an average cured density of 1.49 g/cm$^3$. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.37 g/cm$^3$. (93.9% of theoretical) The unmachined test bars had an average strength (4 pt bend) of 13.08 ksi and after machining the test specimens averaged 13.32 ksi.

Example XII Pressureless Sintering of Boron Carbide Using Silazane Binders

A. Polymer synthesis

A mixture of 112.9 g (0.80 mole) of 1,1-dichloro-1-silacyclobutane, 101.3 g (0.40 mole) of diphenyldichlorosilane and 84.6 g (0.40 mole) of phenyltrichlorosilane dissolved in 1.2 L of dry toluene was cooled to −78° C. Ammonia was rapidly bubbled through the solution for 3 hours. The solution was allowed to warm to room temperature and the excess ammonia distilled off. The solution was filtered through a medium glass frit and the filtrate concentrated in vacuo. The residue was stripped for 3 hours at 150°–170° C. at 1 torr.

B. Polymer pyrolysis and Char Composition Calculations

An aliquot of the resin formed in part A was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. (room temperature to 1800° C. at 10° C./minute) and held at temperature for 2 hours before cooling to room temperature. The sample had a mass retention of 52.2%. The elemental composition of the char was 57.7% carbon and 40.1% silicon and 0.6% oxygen. The following calculation was made: 100 g of cured polymer gives 52.5 g of a ceramic char consisting of 22.2 g silicon (0.79 mole) and 30.3 g carbon. The char consists of 31.5 g of SiC (60.4%) SiC and 20.7 g C (39.6%). Therefore, every g of polymer gives 0.315 g of SiC and 0.207 g of excess C.

C. Mix Preparation and Testing

A mix was prepared using the following procedure: 4.88 g of the resin prepared in part A dissolved in 250 ml of toluene was mixed with 47.64 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars were heated to 250° C. for 24 hours to crosslink the polymer. The test bars had an average cured density of 1.48 g/cm$^3$ and a strength of (4 pt bend) 1309 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.36 g/cm$^3$. (93.7% of theoretical) The unmachined test bars had an average strength (4 pt bend) of 21.12 ksi and after machining the test specimens averaged 21.12 ksi.

Example XIII Pressureless Sintering of Boron Carbide Using Silazane Binders

A. Polymer synthesis

Ammonia was rapidly bubbled through a solution of 90.27 g (0.427 mole) of PhSiCl$_3$, 43.3 g (0.268 mole) of ViSiCl$_3$ and 19.05 g (0.128 mole) MeSiCl$_3$ in approximately 700 ml of toluene cooled to −78° C. After 45 minutes, the ammonia addition was stopped and the reaction allowed to warm to room temperature. The resultant slurry was filtered through a medium glass frit and the filtrate concentrated in vacuo. 61.9 g (74% yield) of a brittle resin was obtained. T$_g$=96.8° C.

B. Polymer pyrolysis and Char Composition Calculations

An aliquot of the resin formed in part A was weighed into a graphite crucible. The crucible was transferred into an Astro tube furnace. The furnace was evacuated to less than 20 torr and then backfilled with argon. This procedure was repeated twice. Under a purge of argon, the sample was heated to 1900° C. (room temperature to 1900° C. at 15° C./minute) and held at temperature for 2 hours before cooling to room temperature. The sample had a mass retention of 53.8%. The elemental composition of the char was 60.1% carbon and 39.9% silicon (by difference). The following calculation was made: 100 g of cured polymer gives 53.8 g of a ceramic char consisting of 21.5 g silicon (0.77 mole) and 32.3 g carbon. The char consists of 30.7 g of SiC (57.1%) SiC and 23.1 g C (42.9%). Therefore, every g of polymer gives 0.307 g of SiC and 0.231 g of excess C.

C. Mix Preparation and Testing

A mix was prepared using the following procedure: 2.01 g of the resin prepared in part A and 0.035 g Lupersol™ dissolved in 250 ml of toluene was mixed with 22.6 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars were heated to 200° C. for 16 hours to crosslink the polymer. The test bars had an average cured density of 1.39 g/cm$^3$. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.31 g/cm$^3$. (91.5% of theoretical) The machined test bars had an average strength if 21.50 ksi.

Example XIV Pressureless Sintering of Boron Carbide Using Silazane Binders

A. Polymer synthesis

Ammonia was rapidly bubbled through a solution of 185.3 g (0.877 mole) of PhSiCl$_3$ in 500 ml of toluene cooled to −78° C. for 1–2 hours. The solution was allowed to warm to room temperature and the excess ammonia distilled off. The resultant slurry was filtered through a medium glass frit and the filtrate concentrated in vacuo. 80.6 g (72.1) of a brittle resin was obtained. T$_g$= 123.9° C.

B. Polymer pyrolysis and Char Composition Calculations

An aliquot of the resin formed in part A was weighed into a graphite crucible. The crucible was transferred into an Astro tube furnace. The furnace was evacuated to less than 20 torr and then backfilled with argon. This procedure was repeated twice. Under a purge of argon, the sample was heated to 1900° C. (room temperature to 1900° C. at 15° C./minute) and held at temperature for 2 hours before cooling to room temperature. The sample had a mass retention of 49.5%. The elemental composition of the char was 50.8% carbon and 49.2% silicon (by difference). The following calculation was made: 100 g of cured polymer gives 49.5 g of a ceramic char consisting of 24.3 g silicon (0.87 mole) and 25.2 g carbon. The char consists of 34.7 g of SiC (70.2%) SiC and 14.8 g C (29.8%). Therefore, every g of polymer gives 0.347 g of SiC and 0.148 g of excess C.

C. Mix Preparation and Testing

A mix was prepared using the following procedure: 2.5 g of the resin prepared in part A dissolved in 250 ml of toluene was mixed with 22.5 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 35×8×2 mm in a WC lined die with a Carver laboratory press at 46 ksi. The test bars had an average density of 1.45 g/cm$^3$ and a strength (4-pt bend) of 338 psi. The test bars were fired to 2275° C. in argon using the following program: room temperature to 1200° C. at 10° C./minute, a 30 minute hold, 1200°–2275° C. at 10° C./minute with a 30 minute hold at temperature. The average density of the test bars was 2.33 g/cm$^3$ (92.5% of theoretical). The machined test bars had an average strength if 22.74 ksi.

Example XV. Pressureless Sintering of Boron Carbide Powder Using Borosiloxane Binder A. Polymer Synthesis 41.52 g (0.40 moles) of B(OMe)$_3$ was added to a stirring mixture of 39.6 g (0.20 moles) of Ph(OMe)$_3$, 23.25 g (0.125 moles) of (Me$_2$SiVi)$_2$O, 48.8 g (0.20 moles) of Ph$_2$Si(OMe)$_2$, 46.8 g (2.6 moles) of distilled water and 0.20 mL of CF$_3$SO$_3$H. The reaction was refluxed for 2 hours and then stirred at room temperature for 12 hours. The methanol and water were removed by distillation until the distillate temperature reached > 90° C. The reaction was cooled and 0.56 g of NaHCO$_3$ and 115 g of toluene added. The toluene solution was refluxed and the water removed in a Dean- Stark trap. When the distillate was clear (ca. 3–4 hours), the reaction was cooled and 1 mL of Me$_2$SiViCl added. After stirring for 0.5 hours, the reaction was filtered and the filtrate concentrated in vacuo. The yield was 90.75 g. (92.7%)

B. Polymer pyrolysis and Char Composition Calculations

A blend of 6.07 g of the resin formed in part A and 0.23 g of Lupersol™ was prepared and an aliquot was crosslinked at 200° C. for 3 hours in an argon atmosphere. An aliquot of the crosslinked polymer was weighed into a graphite crucible. The crucible was transferred into an Astro tube furnace. The furnace was evacuated to less than 20 torr and then backfilled with argon. This procedure was repeated twice. Under a purge of argon, the sample was heated to 1900° C. (room temperature to 1900° C. at 15° C./minute) and held at temperature for 2 hours before cooling to room temperature. The sample had a mass retention of 26.3%. The elemental composition of the char was 48.7% carbon, 5.0% boron and 41.2% silicon (by difference). The following calculation was made: 100 g of cured polymer gives 26.3 g of a ceramic char consisting of 46.3 wt % silicon (by difference), 48.7 wt % carbon and 5.0 wt % boron. The char consists of 17.4 g of SiC (66.1%), 7.6 g C (28.9%) and 1.5 g B(4.9%). Therefore, every g of polymer gives 0.174 g of SiC, 0.013 g B and 0.076 g of excess C.

C. Mix Preparation and Testing

A mix was prepared using the following procedure: 2.50 g of the resin prepared in part A and 0.08 g of Lupersol™ dissolved in 250 ml of toluene were mixed with 22.50 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 140 micron mesh sieve. The sieved powder was dry pressed into test bars 35×8×2 mm in a WC lined die with a Carver laboratory press at 46 ksi. The test bars were then cured in an argon atmosphere by heating to 200° C. at 3° C./minute and holding for 1 hour. The test bars were fired to 2250° C. in argon using the following program: room temperature to 1200° C. at 10° C./minute, a 30 minute hold, 1200°–2250° C. at 10° C./minute with a 2 hour hold at temperature. The average density of the test bars was 2.275 g/cm$^3$. (90.03% of theoretical) The machined test bars had an average strength (4 pt bend) of 26.25 ksi.

TABLE 2

| | | | | Pressureless Sintering | | |
|---|---|---|---|---|---|---|
| Ex No | Binder | % Binder | % C/% SiC | Cure Conditions | Cured Dens | Cured MOR (psi) |
| 6 | Siloxane | 12.79 | 2.06/4.11 | 250° C./24 hrs | 1.483 | 1680 |
| 7 | Phenolic | 4.03 | 2.06/0.0 | none | 1.352 | 175 |
| 8 | +PN + PCS | 7.5/2.5 | 2.04/4.14 | none | 1.445 | 210 |
| 9 | Siloxane | 14.07 | 1.01/5.67 | 250° C./24 hrs | 1.505 | 1595 |
| 10 | Siloxane | 9.5 | 0.35/3.27 | none | 1.406 | 306 |
| 11 | *Siloxane | 12.82 | 2.06/4.11 | 250° C./24 hrs | 1.487 | na |
| 12 | Silazane | 10.24 | 2.00/3.05 | 250° C./24 hrs | 1.476 | 1309 |
| 13 | Silazane | 8.0 | 1.85/2.46 | 200° C./16 hrs | 1.39 | |
| 14 | Silazane | 10.0 | 1.47/3.48 | none | 1.45 | 338 |
| 15 | Borosiloxane | 9.0 | 0.76/1.74 | 200° C./3 hours | | |

| | | Ceramic Properties after 2275° C. Pyrolysis | | | | |
|---|---|---|---|---|---|---|
| Ex | Density | % Theo | MOR | Mach | X-ray Analysis (wt %) | | |
| No | (g/cc) | Density | (ksi) | MOR | B$_4$C | SiC | C |
| 6 | 2.39 | 94.8 | 15.7 | 14.9 | 95.9 | 4.1 | 1.0 |
| 7 | 2.15 | 85.4 | 24.2 | 24.3 | 99.4 | trace | |
| 8 | 2.41 | 95.5 | 14.4 | 15.5 | 92.2 | 7.8 | 2–3 |
| 9 | 2.39 | 94.8 | 19.3 | 19.6 | 93.8 | 6.2 | trace |
| 10 | 2.34 | 92.9 | 22.3 | 30.4 | 95.9 | 4.1 | none |
| 11 | 2.37 | 93.9 | 13.1 | 13.3 | 95.0 | 5.0 | trace |
| 12 | 2.36 | 93.7 | 21.1 | 21.1 | 96.0 | 4.0 | <1 |
| 13 | 2.31 | 91.5 | | 21.5 | 97.8 | 2.2 | trace |
| 14 | 2.33 | 92.5 | | 22.7 | 95.9 | 4.1 | trace |
| 15 | 2.275 | 90.03 | | 26.25 | | | |

+ PN = Phenolic Resin
*The boron carbide was washed with 1 molar sulfuric acid prior to use.

Example XVI Transfer Molding of Boron Carbide with Siloxane Binders

A. Test Bar Fabrication and Testing

In a double armed Sigma Mixer at 110° C. was placed 658 g of ESK boron carbide powder, 435.5 g of the resin produced in Example X part A and 3.7 g of Lupersol™. The mixer was run at 33 rpm for approximately 1 hour at which time the heating was stopped and the material removed. The mix was transfer molded into a 12 cavity test bar mold (each cavity= 6.2×37.8×2.5 mm) at 195° C. with a ram pressure of 1250 psi and a clamping pressure of 1850 psi. After removal from the hot mold in 5 minute cycles the test bars were further cured at 250° C. for 16 hours. The test bars had an average cured density of 1.63 g/cm$^3$ and a cured strength of 2540 psi. The test bars were fired to 2225° C. in an argon atmosphere using the following schedule: room temperature to 200° C. at 3° C./minute, 200° to 1400° C. at 1° C./minute, a 30 minute hold, 1400° to 2225° C. at 1° C./minute with a 30 minute hold at temperature. The furnace was cooled at a rate of 10° C./minute to 900° C. The average density of the fired test bars was 2.33 g/cm$^3$ (88.14% of theoretical) The unmachined test bars had an average strength (4 pt bend) of 10.92 ksi.

Example XVII Transfer Molding of Boron Carbide Using Silazane Binders

A. Polymer synthesis

A mixture of 610 g (4.4 mole) of 1,1-dichloro-1-silacyclobutane, 278 g (1.10 mole) of diphenyldichlorosilane and 375 g (2.40 mole) of methyltrichlorosilane dissolved in 8 L of dry toluene was cooled to −78° C. Ammonia was rapidly bubbled through the solution for 3 hours. The solution was allowed to warm to room temperature and the excess ammonia distilled off. The solution was filtered through a medium glass frit and the filtrate concentrated in vacuo. The residue was stripped for 3 hours at 150°–170° C. at 1 torr.

B. Polymer pyrolysis and Char Composition Calculations

An aliquot of the resin formed in part A was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. (room temperature to 1800° C. at 10° C./minute) and held at temperature for 2 hours before cooling to room temperature. The sample had a mass retention of 45.0%. The elemental composition of the char was 50.6% carbon and 48.6% silicon and 0.23% oxygen. The following calculation was made: 100 g of cured polymer gives 45.0 g of a ceramic char consisting of 21.9 g silicon (0.78 mole) and 22.8 g carbon. The char consists of 31.3 g of SiC (70.0%) SiC and 13.4 g C (30.0%). Therefore, every g of polymer gives 0.313 g of SiC and 0.134 g of excess C.

C. Test Bar Fabrication and Testing

In a Brabender mixer at 140° C. was placed 50.1 g of ESK boron carbide powder, 0.3 g zinc stearate and 25.8 g of the resin produced in part A. The mixer was run at 60 rpm for approximately 0.5 hour at which time the heating was stopped and the material removed. The mix was transfer molded into a 12 cavity test bar mold (each cavity= 6.2× 37.8×2.5 mm) at 240° C. with a ram pressure of 800 psi and a clamping pressure of 1850 psi. After removal from the hot mold in 10 minute cycles the test bars were further cured at 250° C. for 16 hours. The test bars had an average cured density of 1.64 g/cm$^3$ and a cured strength of 1871 psi. The test bars were fired to 2225° C. in an argon atmosphere using the following schedule: room temperature to 200° C. at 3° C./minute, 200° to 1400° C. at 1° C./minute, a 30 minute hold, 1400° to 2225° C. at 1° C./minute with a 30 minute hold at temperature. The furnace was cooled at a rate of 10° C./minute to 900° C. The average density of the fired test bars was 2.37 g/cm$^3$ (91.3% of theoretical) The unmachined test bars had an average strength (4 pt bend) of 13.28 ksi.

TABLE 3

Molding Examples

| Ex No | Binder | % Binder | % C/% SiC | Spiral Flow | Cured Dens | Cured MOR (psi) |
|---|---|---|---|---|---|---|
| 16 | Siloxane | 40 | 3.41/19.15 | 9.0 | 1.63 | 2540 |
| 17 | Silazane | 34 | 5.6/13.1 | 28.5 | 1.64 | 1871 |

Ceramic Properties after 2275° C. Pyrolysis

| Ex No | Density (g/cc) | % Theo Density | MOR (ksi) | X-ray Analysis (wt %) | | |
|---|---|---|---|---|---|---|
| | | | | B$_4$C | SiC | C |
| 16 | 2.33 | 88.1 | 10.9 | 75.0 | 24.8 | trace |
| 17 | 2.37 | 91.3 | 13.3 | 76.0 | 24.4 | trace |

Example XVIII Effect of Sintering Temperature on Fired Properties

A. Test Bar Fabrication and Testing

One inch test samples were uniaxially pressed from the mixes of Examples VI, VII, VIII and X. These test samples were fired using the following schedule: room temperature to 1200° C. at 10° C./minute, a 30 minute hold, 1200° to temperature at 10° C./minute with a 30 minute hold at temperature. The final temperatures were 2225° C., 2250° C., and 2275° C. The data is summarized in the following table (Table 4). This data clearly shows that temperatures in excess of 2250° C. are preferred to achieve high density pressureless sintered boron carbide with these binder systems.

TABLE 4

EFFECT OF SINTERING TEMPERATURE

| | Fired to 2275° C. | | Fired to 2250° C. | | Fired to 2225° C. | |
|---|---|---|---|---|---|---|
| Ex No | Density g/cc (%) | MOR (ksi) | Density g/cc (%) | MOR (ksi) | Density g/cc (%) | MOR (ksi) |
| 6 | 2.15(85.4) | 24.25 | 2.06(81.9) | 28.15 | 1.95(77.8) | 17.87 |
| 7 | 2.41(95.5) | 15.55 | 2.26(89.6) | 32.54 | 2.24(88.9) | 35.29 |
| 8 | 2.39(94.8) | 14.9 | 2.27(89.9) | 31.62 | 2.24(88.9) | 35.05 |
| 10 | 2.34(92.9) | 30.35 | 2.27(90.1) | 31.68 | 2.13(84.6) | 27.88 |

NOTE:
The density value in parentheses is the % of theoretical density of boron carbide.

Example XIX Isopressing of Large Bars and Disks

A. Part fabrication and Testing

A mix was prepared using the following procedure: 47.0 g of the resin prepared in Example 10, part A and 0.50 g Lupersol™ dissolved in 1000 mL of toluene was mixed with 450 g of ESK boron carbide powder in a beaker. The mixture was ultrasonicated for 10 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 53.25×12.7×4.75 mm and disks 75.0 mm in diameter in WC lined dies with a Frecon Automated laboratory press at 10 ksi. The samples were then placed in a latex bag, evacuated and isopressed at 30 ksi followed by curing at 250° C. for 4 hours under argon. The test bars were fired to 2300° C. in argon using the following program: room temperature to 1200° C. at 5° C./minute, a 30 minute hold, 1200°–1500° C. at 2.5° C./minute under vacuum and 1500°–2300° C. at 5° C./minute with a 1 hour hold at temperature. The data for this Example is set forth in tables 5 and 6.

Example XX Isopressing of Large Bars and Disks

A. A mix was prepared using the following procedure: 78 g of the resin prepared in Example 1, part A and 0.50 g Lupersol™ dissolved in 1000 ml of hexane was mixed with 450 g of ESK boron carbide powder in a beaker. The mixture was ultrasonicated for 10 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 53.25×12.7×4.75 mm and disks 75 mm in diameter in WC lined dies with a Frecon Automated laboratory press at 10 ksi. The samples were then placed in a latex bag, evacuated and isopressed at 30 ksi followed by curing at 250° C. for 4 hours under argon. The test bars were fired to 2300° C. in argon using the following program: room temperature to 1200° C. at 5° C./minute, a 30 minute hold, 1200°–1500° C. at 2.5° C./minute under vacuum and 1500°–2300° C. at 5° C./minute with a 1 hour hold at temperature. The data for the products produced by this Example is set forth in tables 5 and 6.

Example XXI Isopressing of Large Bars and Disks with Phenolic Resin and Polycarbosilane (For Comparison)

A. A mix was prepared using the following procedure: 1.39 g of Phenolic Resin and 3.79 g of polycarbosilane dissolved in 250 ml of tetrahydrofuran was mixed with 45.11 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 53.25×12.7×4.75 mm in WC lined dies with a Frecon Automated laboratory press at 10 ksi. The samples were then placed in a latex bag, evacuated and isopressed at 30 ksi followed by curing at 250° C. for 4 hours under argon. The test bars were fired to 2300° C. in argon using the following program: room temperature to 1200° C. at 5° C./minute, a 30 minute hold, 1200°–1500° C. at 2.5° C./minute under vacuum and 1500°–2300° C. at 5° C./minute with a 1 hour hold at temperature. The data for the products produced by this Example is set forth in table 5.

Example XXII Isopressing of Large Bars and Disks with Phenolic Resin (For Comparison)

A. A mix was prepared using the following procedure: 2.016 g of Phenolic Resin dissolved in 250 ml of acetone was mixed with 48.98 g of ESK boron carbide powder in a beaker. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The sieved powder was dry pressed into test bars 53.25×12.7×4.75 mm in WC lined dies with a Frecon Automated laboratory press at 10 ksi. The samples were then placed in a latex bag, evacuated and isopressed at 30 ksi followed by curing at 250° C. for 4 hours under argon. The test bars were fired to 2300° C. in argon using the following program: room temperature to 1200° C. at 5° C./minute, a 30 minute hold, 1200°–1500° C. at 2.5° C./minute under vacuum and 1500°–2300° C. at 5° C./minute with a 1 hour hold at temperature. The data for the products produced by this Example is set forth in table 5.

TABLE 5

ISOPRESSED TEST BARS

| Ex No | Cured Density (g/cc) | Firing Temp (°C.) | Fired Density (g/cc) | (% theo) | Machined MOR (ksi) |
|---|---|---|---|---|---|
| 19 | 1.45 | 2300 | 2.33 | 92.5 | 23.89 ± 0.73 |
| 20 | 1.59 | 2275 | 2.38 | 94.4 | 41.94 ± 4.74 |
| 21 | 1.42 | 2275 | 2.28 | 90.5 | 24.68 ± 1.53 |
| 22 | 1.32 | 2275 | 2.06 | 81.7 | 24.44 ± 2.04 |

TABLE 6

ISOPRESSED DISKS

| Ex No | Fired Density | % Theo Density | Firing Conditions |
|---|---|---|---|
| 19 | 2.19 | 86.9 | 2300° C. - 2 hour hold |
|  | 2.14 | 84.9 | 2300° C. - 2 hour hold |
|  | 2.13 | 84.5 | 2300° C. - 2 hour hold |
| 20 | 2.34 | 92.9 | 2275° C. - 2 hour hold |
|  | 2.34 | 92.9 | 2275° C. - 2 hour hold |
|  | 2.37 | 93.9 | 2275° C. - 2 hour hold |

That which is claimed is:

1. A method of preparing a sintered boron carbide body comprising:
   (a) blending components comprising boron carbide powder and a preceramic organosilicon polymer selected from the group consisting of polysiloxanes, polysilazanes, polysilanes, metallopolysiloxanes and metallopolysilanes to a uniform mixture, where the preceramic organosilicon polymer is present in an amount such that the free carbon value of the mixture is greater than 0.2 weight percent based on the total weight of the boron carbide powder and the char derived form the preceramic organosilicon polymer;
   (b) forming the uniform mixture into the desired shape under pressure at a temperature less than about 500° C. to obtain a handleable green body; and
   (c) sintering the handleable green body in an inert atmosphere at a temperature greater than about 2200° C. to obtain a sintered body with a density greater than about 2.0 g/cm$^3$.

2. The method of claim 1 wherein the free carbon content of the char derived from the preceramic organosilicon polymer is determined prior to forming a handleable green body by heating a known amount of the preceramic organosilicon polymer under an inert atmosphere to an elevated temperature for a time sufficient to convert the preceramic organosilicon polymer into a stable ceramic char material, determining the stable ceramic char yield and the silicon and carbon content of the stable ceramic char material, and then calculating the amount of free carbon in the stable ceramic char material per part of the preceramic organosilicon polymer.

3. The method of claim 2 wherein at least one agent which promotes crosslinking selected from the group consisting of curing agents and crosslinking agents is additionally present in the uniform mixture in an amount effective to crosslink the preceramic organosilicon polymer.

4. The method of claim 3 wherein the curing agent is selected from the group consisting of organic peroxides which are present at 0.1 to 5.0 weight percent based on the weight of the preceramic organosilicon polymer and platinum-containing catalysts which are present at 1.0 to 1000 ppm platinum based on the weight of the preceramic organosilicon polymer, and the crosslinking agent comprises a siloxane with Si—H functional units.

5. The method of claim 2 wherein the free carbon value of the mixture is between about 0.5 and 3 weight percent.

6. The method of claim 5 wherein the handleable green body is sintered at a temperature of about 2275° C.

7. The method of claim 2 wherein the preceramic organosilicon polymer is an organopolysiloxane comprising units selected from the group consisting of (MeSiO$_{1.5}$), (MePhSiO), (PhSiO$_{1.5}$), (Ph2SiO) and (PhViSiO) in varying mole fractions to provide resinous polymers with convenient molding characteristics.

8. The method of claim 2 wherein the preceramic organosilicon polymer is an organopolysilazane comprising units selected from the group consisting of [Ph₂SiNH], [PhSi(NH)₁.₅], and/or

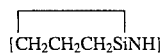

in varying mole fractions to provide resinous polymers with convenient molding characteristics.

9. The method of claim 2 wherein the boron carbide powder has an average particle size less than 5 microns.

10. The method of claim 2 wherein the method of forming the handleable green body is selected from the group consisting of hot pressing, dry pressing, transfer molding, injection molding and slip casting.

11. The method of forming a handleable green body comprising:
(a) blending components comprising boron carbide powder and a preceramic organosilicon polymer selected from the group consisting of polysiloxanes, polysilazanes, polysilanes, metallopolysiloxanes and metallopolysilanes to a uniform mixture, where the preceramic organosilicon polymer is present in an amount such that the free carbon value of the mixture is greater than 0.2 weight percent based on the total weight of the boron carbide powder and the char derived form the preceramic organosilicon polymer; and
(b) forming the uniform mixture into the desired shape under pressure at a temperature less than about 500° C.

12. The method of claim 11 wherein the free carbon content of the char derived from the preceramic organosilicon polymer is determined prior to forming a handleable green body by heating a known amount of the preceramic organosilicon polymer under an inert atmosphere to an elevated temperature for a time sufficient to convert the preceramic organosilicon polymer into a stable ceramic char material, determining the stable ceramic char yield and the silicon and carbon content of the stable ceramic char material, and then calculating the amount of free carbon in the stable ceramic char material per part of the preceramic organosilicon polymer.

13. The method of claim 12 wherein at least one agent which promotes crosslinking selected from the group consisting of curing agents and crosslinking agents is additionally present in the uniform mixture in an amount effective to crosslink the preceramic organosilicon polymer.

14. The method of claim 13 wherein the curing agent is selected from the group consisting of organic peroxides which are present at 0.1 to 5.0 weight percent based on the weight of the preceramic organosilicon polymer and platinum-containing catalysts which are present at 1.0 to 1000 ppm platinum based on the weight of the preceramic organosilicon polymer, and the crosslinking agent comprises a siloxane with Si—H functional units.

15. The method of claim 12 wherein the free carbon value of the mixture is between about 0.5 and 3 weight percent.

16. The method of claim 12 wherein the preceramic organosilicon polymer is an organopolysiloxane comprising units selected from the group consisting of (MeSiO₁.₅), (MePhSiO), (PhSiO₁.₅), (Ph₂SiO) and (PhViSiO) in varying mole fractions to provide resinous polymers with convenient molding characteristics.

17. The method of claim 12 wherein the preceramic organosilicon polymer is an organopolysilazane comprising units selected from the group consisting of [Ph₂SiNH], [PhSi(NH)₁.₅], and/or

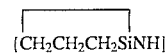

in varying mole fractions to provide resinous polymers with convenient molding characteristics.

18. The method of claim 12 wherein the boron carbide powder is has an average particle size less than 5 microns.

19. The method of claim 12 wherein the method of forming the handleable green body is selected from the group consisting of hot pressing, dry pressing, transfer molding, injection molding and slip casting.

20. A uniform mixture comprising boron carbide powder and a preceramic organosilicon polymer selected from the group consisting of polysilazanes, polysilanes, metallopolysiloxanes and metallopolysilanes, where the preceramic organosilicon polymer is present in an amount such that the free carbon value of the mixture is greater than 0.2 weight percent based on the total weight of the boron carbide powder and the char derived form the preceramic organosilicon polymer.

21. The mixture of claim 20 wherein at least one agent which promotes crosslinking selected from the group consisting of curing agents and crosslinking agents is additionally present in the uniform mixture in an amount effective to crosslink the preceramic organosilicon polymer.

22. The mixture of claim 21 wherein the curing agent is selected from the group consisting of organic peroxides which are present at 0.1 to 5.0 weight percent based on the weight of the preceramic organosilicon polymer and platinum-containing catalysts which are present at 1.0 to 1000 ppm platinum based on the weight of the preceramic organosilicon polymer, and the crosslinking agent comprises a siloxane with Si—H functional units.

23. The mixture of claim 20 wherein the free carbon value of the mixture is between about 0.5 and 3 weight percent.

24. The mixture of claim 20 wherein the preceramic organosilicon polymer is an organopolysilazane comprising units selected from the group consisting of [Ph₂SiNH], [PhSi(NH)₁.₅], and/or

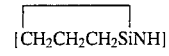

in varying mole fractions to provide resinous polymers with convenient molding characteristics.

25. The mixture of claim 20 wherein the boron carbide powder is has an average particle size less than 5 microns.

26. A uniform mixture consisting essentially of boron carbide powder and a preceramic organopolysiloxanes, where the preceramic organopolysiloxane is present in an amount such that the free carbon value of the mixture is greater than 0.2 weight percent based on the total weight of the boron carbide powder and the char derived form the preceramic organopolysiloxane.

27. The mixture of claim 26 wherein the free carbon value of the mixture is between about 0.5 and 3 weight percent.

28. The mixture of claim 27 wherein the preceramic organopolysiloxane comprises units selected from the group consisting of (MeSiO₁.₅), (MePhSiO), (PhSiO₁.₅), (Ph₂SiO) and (PhViSiO) in varying mole fractions to provide resinous polymers with convenient molding characteristics.

29. The mixture of claim 28 wherein the boron carbide powder is has an average particle size less than 5 microns.

* * * * *